United States Patent Office 3,275,499
Patented Sept. 27, 1966

3,275,499
STABILIZED ORGANIC SULPHUR-CONTAINING PHOSPHOROUS INSECTICIDES
Henry Kassler, Dan-y-Graig, Groes, Margam, Glamorgan, England, and Neville Garton Cutler, 22 Hool Fawr, North Cornelly, near Pyle, Glamorgan, England
No Drawing. Filed Mar. 13, 1963, Ser. No. 264,773
5 Claims. (Cl. 167—22)

The present invention relates to insecticides and in particular to the deodorising of sulphur-containing insecticides of the type in which thiol groups are formed by decomposition, for example the O,O-dimethyl S-(1,2-dicarbethoxyethyl) phosphorodithioate, sold under the registered trade mark "Malathion."

"Malathion" is one of the most powerful and yet safe insecticides known today, but it has the serious disadvantage that it smells offensively when freshly made, the smell becoming worse on storage. This disadvantage has hitherto been combated in two ways. The first is the addition of industrial perfumes, but this gives a product which still smells strongly. The second is the further purification of the material, but the product so obtained, apart from being more expensive, develops the offensive smell once again, although to a lesser degree, when it is stored, especially under tropical conditions. Similar disadvantages are encountered in the case of other sulphur-containing insecticides which contain thiol groups as a result of decomposition.

It has now been found that if a sulphur-containing insecticide such as "Malathion" is treated with a compound of a multivalent heavy metal such as chromium, copper, cobalt, lead, manganese or mercury in the presence of oxygen or an oxygen donor the smell is removed and moreover does not return in storage, at any rate for a considerable period. The oxygen may be present in the form of air or oxygen gas; alternatively, an oxygen donor may be mixed with the insecticide or a solution thereof.

Accordingly, the present invention provides a method of deodorising a sulphur-containing insecticide of the type specified by the treatment thereof with a compound of a multivalent heavy metal in the presence of oxygen or an oxygen donor.

One manner of putting the invention into practice is to add to the insecticide or a solution thereof a small proportion of an organic complex or salt of the heavy metal soluble in aromatic or aliphatic solvents, for example a salt of a fatty acid or naphthenic or abietic acid. Another group of compounds which are valuable for the purposes of the invention are "masked" compounds of the heavy metals, that is to say, compounds in which the metal exists in the form of an unstable complex, for example an unstable chelate, in which a proportion of the metal content is in a catalytically active condition. An example of such a complex is the copper complex with ethyl acetoacetate. An oxygen donor may be also added, but the addition of the heavy metal compound alone will suffice when the insecticide is in contact with air. Thus the invention also provides an insecticidal composition containing a sulphur-contaning insecticide of the type specified in admixture with a small proportion of such a complex or salt and optionally with an oxygen donor.

Suitable proportions of an organic compound of copper, which may be quoted by way of example, are between 0.1 and 1% of copper naphthenate, resinate or fatty acid salt, or the copper complex of ethyl acetoacetate based on the weight of insecticide.

The effectiveness of the organic heavy metal compound in such a composition depends on the availability of oxygen, either in the form of atmospheric oxygen present during storage or in the form of an oxygen donor additionally present in the composition. When the insecticide is to be stored for long periods in closed containers it is advantageous to add an oxygen donor such as an organic peroxide, for example methyl ethyl ketone peroxide, to the composition to avoid the development of odor when all the oxygen initially present in the container has been exhausted. Oxygen can also be introduced into the insecticide or into a formulation of the insecticide with a solvent and an emulsifier by bubbling in air or oxygen gas or agitating it violently in contact with air.

As an alternative to copper, corresponding compounds of other heavy metals, for example cobalt, lead, manganese, mercury and chromium, may be used.

It may be noted that it is not possible to use in such a composition an inorganic copper salt such as copper chloride, since the presence of heavy metals in such ionisable form leads to gelling of the insecticide, and so reduces the active content of insecticide preparations and interferes with their application.

Any possible gelling of the insecticide in such a composition according to the invention due to the incorporation of an excessive amount of the heavy metal compound can be additionally guarded against by washing to remove the excess metal or by adding a chelating agent, for example 8-hydroxyquinoline.

An alternative manner of putting the invention into practice is to pass the insecticide in solution in a compatible organic solvent, preferably at about 50% concentration, through a column of an inorganic salt of the heavy metal in the presence of oxygen or an oxygen donor. Air or oxygen gas may be passed through the column simultaneously with the insecticide to provide the necessary oxygen. Alternatively an oxygen donor may be added to the solution of the insecticide, and this will have the advantage of providing additional protection against the development of the smell during prolonged storage.

Apart from "Malathion," other insecticides which can be treated according to the invention include "Trithion" and "Parathion."

Three processes embodying the method according to the invention will now be described by way of example.

Example 1.—100 g. technical "Malathion" are shaken with 7 ml. ether containing 0.5 g. of copper naphthenate for 2–3 minutes and then 1 g. methyl ethyl ketone peroxide is added. Complete deodorisation can be observed immediately.

Example 2.—52 g. of technical "Malathion" are mixed and shaken with 25 ml. Shellsol E (an 84% aromatic solvent) and 6 g. emulsifying agent. 26 ml. Shellsol E containing 0.3 g. cupric stearate are slowly added and an emulsifiable "Malathion" concentrate free from the smell of the insecticide is obtained. The stability of the formulation can be further improved by the addition of 0.5–1 g. methyl ethyl ketone peroxide.

Example 3.—520 g. technical "Malation" are mixed with 510 ml. Shellsol E containing 60 g. emulsifying agent. This solution is run through a 2" diameter column filled with a granular catalyst containing 10 g. $CuCl_2 \cdot 2H_2O$ mixed with an inert carrier. A steady, slow stream of air is passed through the column and the solution is passed through at the rate of 600 ml. per hour. The resulting solution is entirely free of the odor of "Malathion" and remains so for several months. The effect can be made even more permanent in a closed bottle by the addition to the solution of 1% urea hydroperoxide.

What is claimed is:
1. An insecticidal composition having relatively low malodorous characteristics comprising O,O-dimethyl-S-(1,2-dicarbethoxyethyl) phosphorodithioate and for each 100 parts by weight thereof, 0.5 part by weight of copper naphthenate and 1 part by weight of methyl ethyl ketone peroxide.

2. An insecticidal composition having relatively low malodorous characteristics comprising as an active insecticidal ingredient an organic sulfur-containing phosphorous insecticide in which thiol groups are formed by decomposition rendering said insecticide normally malodorous, and a polyvalent heavy metal salt of an organic acid and an oxygen donor selected from the group consisting of organic peroxides and organic hydroperoxides.

3. A composition as claimed in claim 2 wherein said heavy metal is selected from the group consisting of copper, cobalt, chromium, lead, manganese and mercury.

4. A composition as claimed in claim 2 wherein said organic acid is selected from the group consisting of naphthenic, abietic and fatty acid.

5. A composition as claimed in claim 2 wherein said polyvalent heavy metal salt is a complex of copper and ethyl acetoacetate.

References Cited by the Examiner
UNITED STATES PATENTS

| 2,172,314 | 9/1939 | Adams et al. | 167—16 |
| 2,947,659 | 8/1960 | Rogers | 167—16 |
| 2,980,723 | 4/1961 | Frank et al. | 167—22 |
| 3,057,917 | 10/1962 | Maier | 167—22 |

JULIAN S. LEVITT, *Primary Examiner.*

GEORGE A. MENTIS, *Assistant Examiner.*